US010309545B2

(12) United States Patent
Liang et al.

(10) Patent No.: US 10,309,545 B2
(45) Date of Patent: Jun. 4, 2019

(54) FLUID CONTROL DEVICE

(71) Applicant: Delta Electronics Int'l (Singapore) Pte Ltd, Singapore (SG)

(72) Inventors: Qian Liang, Singapore (SG); Song-Bin Huang, Singapore (SG); Wei-Yu Chung, Singapore (SG)

(73) Assignee: DELTA ELECTRONICS INT'L (SINGAPORE) PTE LTD, Singapore (SG)

( * ) Notice: Subject to any disclaimer, the term of this patent is extended or adjusted under 35 U.S.C. 154(b) by 110 days.

(21) Appl. No.: 15/487,056

(22) Filed: Apr. 13, 2017

(65) Prior Publication Data
US 2018/0017175 A1    Jan. 18, 2018

Related U.S. Application Data

(60) Provisional application No. 62/393,210, filed on Sep. 12, 2016.

(30) Foreign Application Priority Data

Jul. 13, 2016    (SG) ............................ 10201605723Y
Mar. 31, 2017    (SG) ............................ 10201702667T

(51) Int. Cl.
*F16K 11/076*    (2006.01)
*F16K 31/00*    (2006.01)
(Continued)

(52) U.S. Cl.
CPC .......... *F16K 11/076* (2013.01); *F16K 11/074* (2013.01); *F16K 31/005* (2013.01); *F16K 31/02* (2013.01); *F16K 39/045* (2013.01)

(58) Field of Classification Search
CPC .......... B01L 3/502738; B01L 2200/10; B01L 2400/0633; B01L 2200/028; F16K 99/0028; F16K 2099/0084
See application file for complete search history.

(56) References Cited

U.S. PATENT DOCUMENTS 3,875,967 A    4/1975    deFries
6,748,975 B2   6/2004    Hartshorne et al.
(Continued)

FOREIGN PATENT DOCUMENTS

| CN | 87203183 U  | 1/1988 |
| CN | 101137834 A | 3/2008 |
| EP | 2775183     | 9/2014 |

*Primary Examiner* — Samuel P Siefke
(74) *Attorney, Agent, or Firm* — Kirton McConkie; Evan R. Witt

(57) ABSTRACT

A fluid control device includes a fluid manifold, a valve stator, a valve rotor and dual driving units. The fluid manifold includes microchannels connected with a sample reaction unit and fluid input channels connected with fluid sources. When the valve rotor is rotated to different positions, the fluid input channel is connected with at least one microchannel via through holes of the valve stator and a groove of the valve rotor. The first driving unit drives a rotation of the valve rotor. The second driving unit drives a motion of the valve rotor or the valve stator to adjust a distance between the valve rotor and the valve stator, so that when the valve rotor is rotating, the valve rotor and the valve stator are separated by a gap, and after the valve rotor is rotated to a predetermined position, the valve rotor is tightly contacted the valve stator.

20 Claims, 12 Drawing Sheets

(51) Int. Cl.
    *F16K 31/02*     (2006.01)
    *F16K 39/04*     (2006.01)
    *F16K 11/074*     (2006.01)

(56) References Cited

U.S. PATENT DOCUMENTS

| | | |
|---|---|---|
| 6,945,269 B2 | 9/2005 | Hattori et al. |
| 7,143,787 B1 | 12/2006 | Bauerle et al. |
| 7,588,051 B2 | 9/2009 | Wolf, Sr. et al. |
| 8,656,955 B2 | 2/2014 | Price |
| 8,770,226 B2 | 7/2014 | Wilen et al. |
| 8,876,081 B2 | 11/2014 | Tower |
| 8,911,688 B2 | 12/2014 | Gransee et al. |
| 9,140,376 B2 | 9/2015 | Farina et al. |
| 2007/0144594 A1* | 6/2007 | Moon .................. F16K 11/074 137/625.46 |
| 2008/0249510 A1 | 10/2008 | Mescher et al. |
| 2015/0020904 A1 | 1/2015 | Gartner et al. |

\* cited by examiner

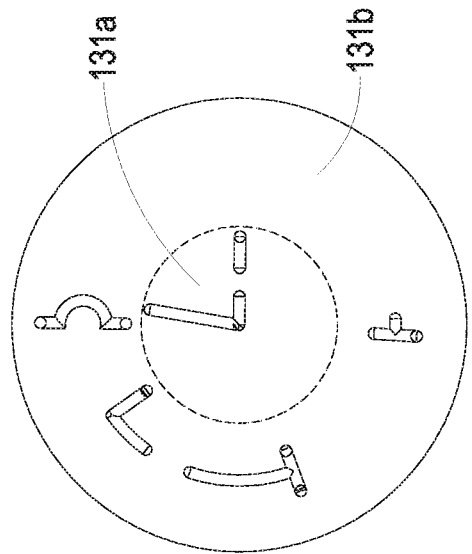
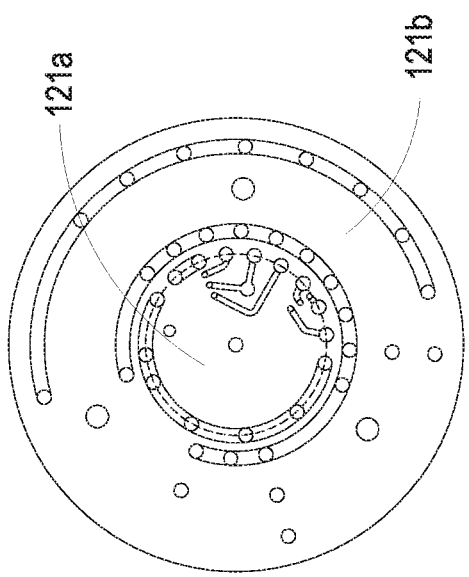
FIG. 8B
FIG. 8A

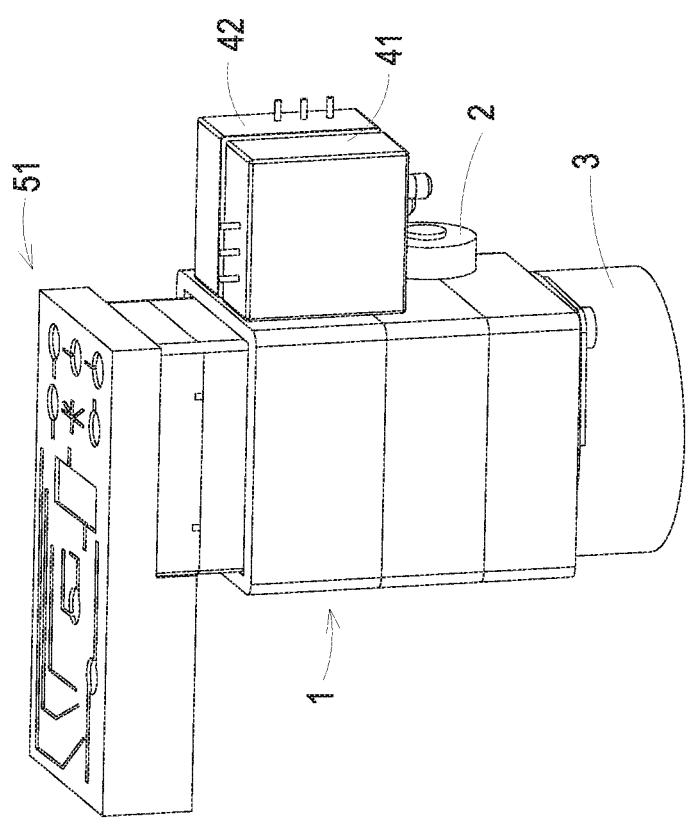

FLUID CONTROL DEVICE

CROSS-REFERENCE TO RELATED APPLICATION

This application claims the benefit of U.S. Provisional Application Ser. No. 62/393,210 filed on Sep. 12, 2016, and claims priorities to Singapore Patent Application No. 10201605723Y filed on Jul. 13, 2016 and Singapore Patent Application No. 10201702667T filed on Mar. 31, 2017, the entire contents of which are incorporated herein by reference for all purposes.

FIELD OF THE INVENTION

The present invention relates to a fluid control device, and more particularly to a fluid control device having a build-in rotary valve and dual driving units.

BACKGROUND OF THE INVENTION

With the advance of technology and modern transportation, the propagation speeds of infectious diseases (e.g., SARS, avian flu, dengue fever and other diseases) are accelerated and become inestimable in today's world. Consequently, scientists are attempting to explore novel solutions for rapidly diagnosing, early isolation as well as suggested therapeutic treatment of suspected cases. In other words, a "real-time and in-situ detecting means" is an important issue to study infectious diseases.

In most practical application of fluid processing and regulating for clinical trials and diagnostics, such as protein purification and bacteria culture, a series of sample processing steps such as tissue dissociation, bacteria capture, cell lysis, nuclear acid extraction and washing, are always inevitable. Typically these processing steps require complex lab protocols and they are operated by skilled researchers with test tubes, pipettes and relevant equipment in a central laboratory.

"Lab-on-a-chip" is a novel concept proposed in recent years. In the lab-on-a-chip technology, various miniature components are integrated within a small platform so as to achieve the purposes of point of care (POC) and in vitro diagnostics (IVD). Essentially, it is a medical diagnostic platform with "miniature volume", "high accuracy" and "real-time diagnostics". Such platform could be effectively realized by microfluidic technology capable of processing various biological and chemical samples or reagents on a business-card-sized chip or cartridge.

On a typical microfluidic device, several common laboratory functions such as flow pumping, valving, mixing, heating and many reactions are compactly integrated on-chip and complex sample processing are normally programmable to realize automatic operations. However, most of lab-on-a-chip technologies developed in the laboratory is not appropriate for industrial applications. For example, in molecular diagnostics, the microfluidic chip used for sample testing requires low-cost, ease of mass production and disposable and therefore plastic chips made by injection molding or hot embossing are still prevalent. As the plastic microfluidic chip or cartridge is very hardly and in most situations unable to completely realize "lab-on-a-chip" functions, fluid dispensing and regulating within multiple chambers on microfluidic devices highly rely on various external pumps, valves, sensors and actuators. In most of these designs, each reagent chamber and microfluidic channel are regulated by one or more individual valves and therefore the isolation or connection of corresponding fluidic loop is solely controlled by the corresponding valve opening or closing.

Such designs, though being able to deliver fluid within the system, are very costly and normally occupy a huge amount of space. Moreover, the valves, the pumps and the microfluidic cartridge are most connected with tubing and therefore yield short lifespan, space consuming, low reliability and poor manufacturability and thus are inappropriate to high volume mass production. Furthermore, such solution is lack of modular design concept and is hardly to be straightforwardly used by other systems without redesign.

Besides, the rotary valve is widely used in many applications for dealing with multi-way fluid control. In order to prevent the rotary valve from leaking during its operation, compression force is always applied on the stator-rotor interface to provide a superior sealing. The forced sealing, though can minimize fluid leakage, actually introduces two issues suffered by most common rotary valves nowadays. First, when the valve turns from one position to the next, a high rotational torque is needed to overcome the friction between stator and rotor, and this requires a huge motor to be integrated. As a result, the size, cost and power consumption of the system increase. Second, because of the presence of friction, the wear and tear between stator and rotor significantly reduces the device lifespan after long-term usage.

Therefore, there is a need of providing a fluid control device in order to overcome the above drawbacks.

SUMMARY OF THE INVENTION

An object of the present invention is to provide a fluid control device using a build-in rotary valve for fluid path switching, so as to reduce the cost and the equipment space as well as improve the reliability and manufacturability. Particularly, the fluid control device employs dual driving units. The first driving unit drives the rotation of the valve rotor. The second driving unit drives the vertical motion of the valve rotor or the valve stator to adjust the distance between the valve rotor and the valve stator, so that when the valve rotor is rotating, the valve rotor and the valve stator are separated by a gap, and after the valve rotor is rotated to a predetermined position, the valve rotor is tightly contacted the valve stator. As a result, a superior sealing is yielded during fluid flowing and the wear and tear is minimized during fluid path switching. Further, a low torque driving unit can be utilized to reduce the device cost and volume, and softer materials can be used for the valve rotor and the valve stator fabrication.

An another object of the present invention is to provide a fluid control device using microchannels in the fluid manifold to deliver fluids, so as to avoid the drawbacks resulted from the tubing used in the conventional techniques.

An additional object of the present invention is to provide a fluid control device to realize multiple fluid path switching by the alignments of the through holes and grooves of the valve stator and the valve rotor.

A further object of the present invention is to provide a fluid control device having modular designed structure, which is able to be applied to different sample reaction units and thus possesses high industrial value.

According to an aspect of the present invention, a fluid control device connected with a sample reaction unit having multiple chambers is provided to regulate fluid operations in a multi-fluid-system. The fluid control device includes a fluid manifold, a rotary valve including a valve stator and a valve rotor, a first driving unit and a second driving unit. The fluid manifold includes a main body, plural microchannels and plural fluid input channels, wherein each of the plural microchannels penetrates through the main body and is connected with a corresponding chamber of the sample reaction unit, and the plural fluid input channels are connected with plural fluid sources. The valve stator is disposed at a bottom of the fluid manifold and includes plural through holes, and the valve rotor is disposed at a bottom of the valve stator and includes at least one groove. When the valve rotor is rotated to different positions, the fluid input channel is connected with at least one of the plural microchannels via the through holes of the valve stator and the groove of the valve rotor to provide at least one fluid path and enable fluid provided by the fluid source to be directed to the corresponding chamber of the sample reaction unit through the fluid path and thus regulate the fluid operation of the corresponding chamber. The first driving unit is connected with and drives a rotation of the valve rotor. The second driving unit is connected with and drives a motion of at least one of the valve rotor and the valve stator to adjust a distance between the valve rotor and the valve stator, so that when the valve rotor is rotating, the valve rotor and the valve stator are separated by a gap, and after the valve rotor is rotated to a predetermined position, the valve rotor is tightly contacted the valve stator.

The above objects and advantages of the present invention become more readily apparent to those ordinarily skilled in the art after reviewing the following detailed description and accompanying drawings, in which:

BRIEF DESCRIPTION OF THE DRAWINGS

FIG. 8A shows a top view of the valve stator;

FIG. 8B shows a top view of the valve rotor;

FIG. 9 shows the assembled structure of the fluid control device and the sample cartridge;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
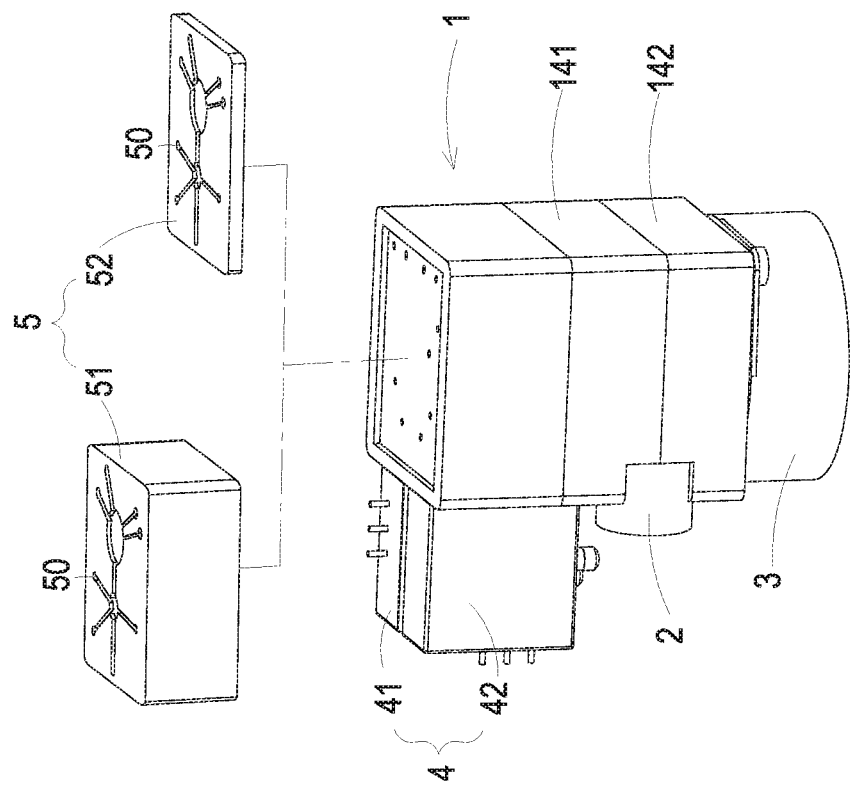
FIG. 1 shows the fluid control device and the sample reaction unit according to a preferred embodiment of the present invention.

The present invention provides a fluid control device connected with a sample reaction unit having multiple chambers to regulate fluid operations in a multi-fluid-system, so that the fluids, such as samples or reagents, in the multiple chambers are pushed to flow toward desired directions. FIG. 1 shows the fluid control device and the sample reaction unit according to a preferred embodiment of the present invention. As shown in FIG. 1, the sample reaction unit 5 is mounted on the fluid control device 1, and the sample reaction unit 5 is a sample cartridge 51 or a microfluidic chip 52. The sample reaction unit 5 includes multiple chambers 50, such as sample chamber, lysis buffer chamber, wash buffer chamber, elution buffer chamber, antibody chamber, reaction chamber, waste chamber, product collection chamber and so on, for processing various biomedical or chemical experiments and detections, such as nuclear acid extractions, protein purifications, clinical disease detections, novel medicine researches, and other biomedical or chemical researches. In these experiments and detections, samples or reagents must flow from the reservoir chamber to the reaction chamber according to the reaction protocols, and the waste must be collected at the waste chamber as well. Therefore, an object of the present invention is to provide a solution for multi-way fluid dispensing and regulating by using the fluid control device 1 with build-in rotary valve to realize automatic processing or detection, and by employing dual driving units to minimize the friction during rotary valve rotation and further reduce the device volume and cost, extend the device lifespan, and is beneficial to the material selection for the valve rotor and the valve stator.

Figure 2A:
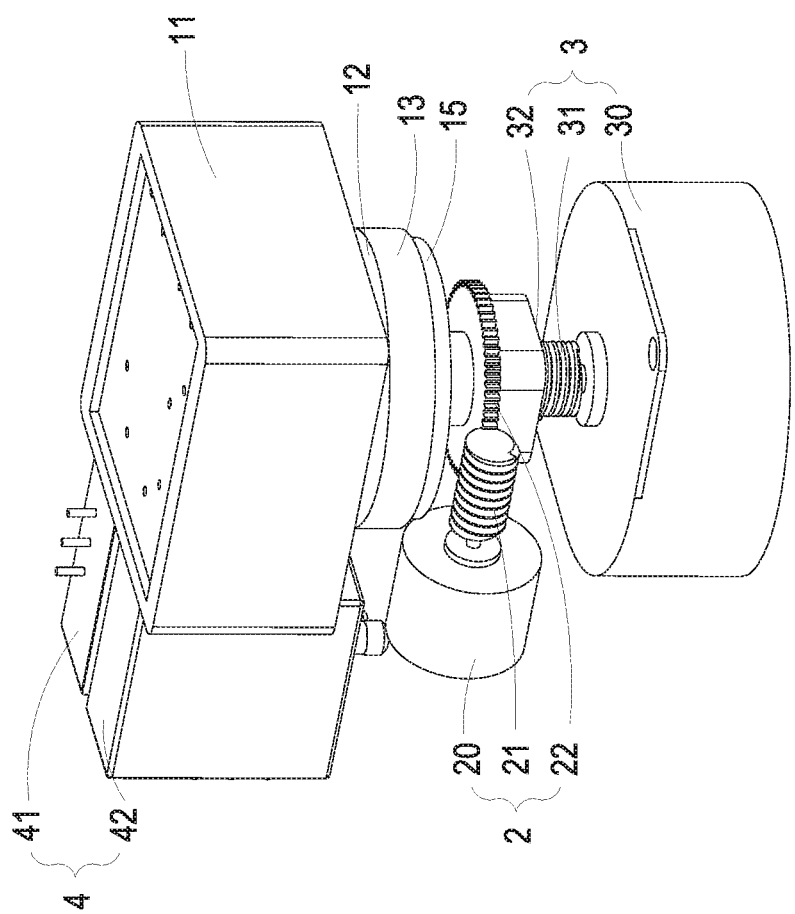
FIG. 2A shows a schematic view of the fluid control device removing partial housings according to a preferred embodiment of the present invention.
Figure 2B:
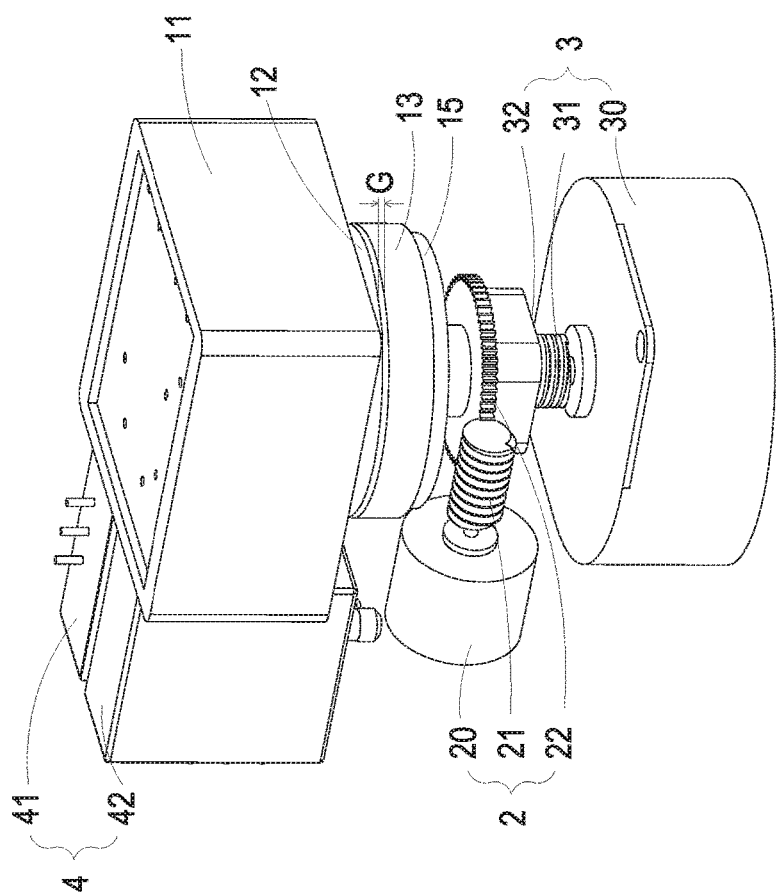
FIG. 2B shows a schematic view of the fluid control device of FIG. 2A while a gap existed between the valve rotor and the valve stator.
Figure 3:
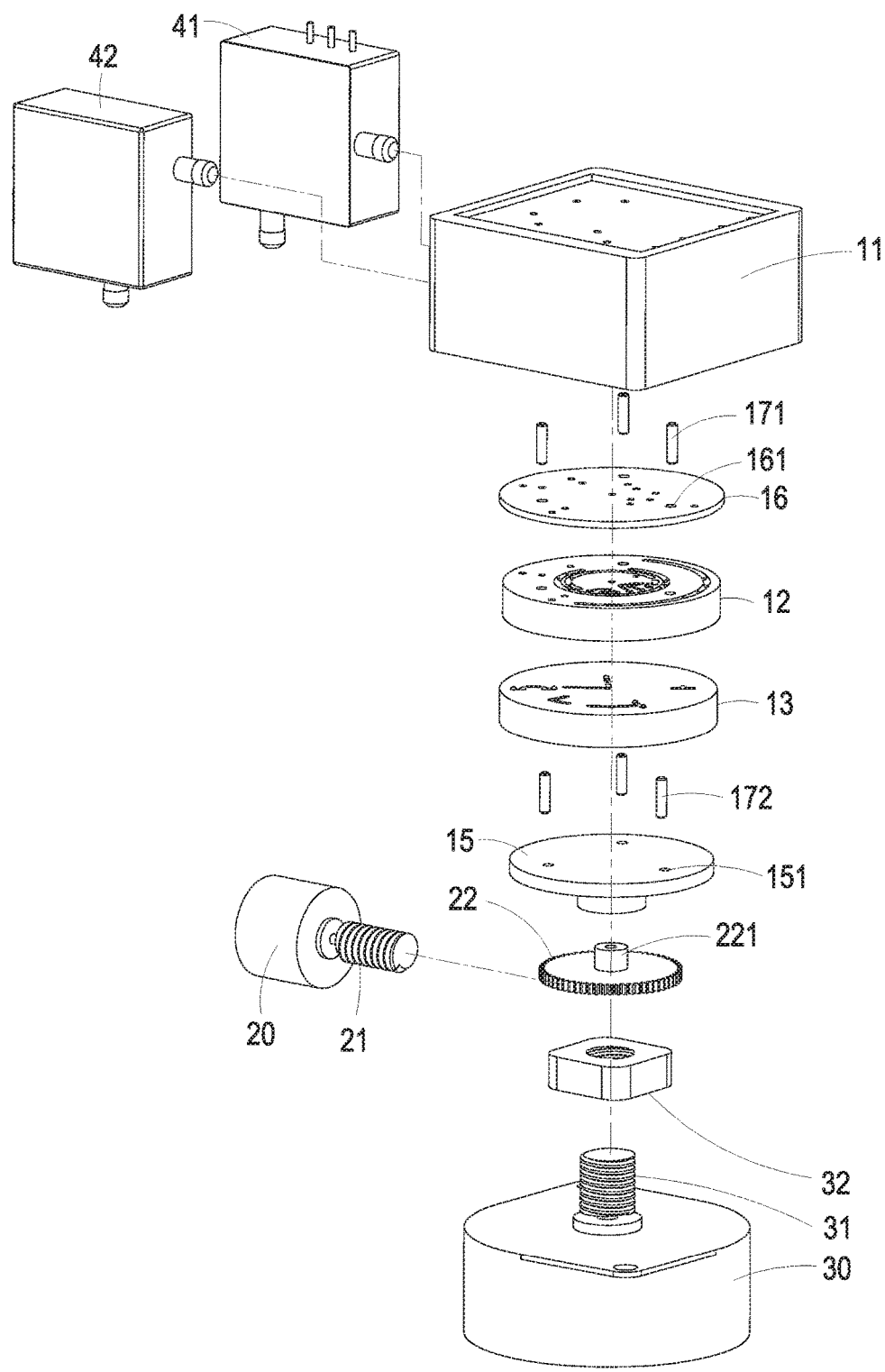
FIG. 3 shows an exploded view of the fluid control device of FIG. 2A.

Please refer to FIGS. 1 to 3. FIG. 2A shows a schematic view of the fluid control device removing partial housings according to a preferred embodiment of the present invention, and FIG. 2B shows a schematic view of the fluid control device of FIG. 2A while a gap existed between the valve rotor and the valve stator. FIG. 3 shows an exploded view of the fluid control device of FIG. 2A. As shown in FIGS. 1 to 3, the fluid control device 1 includes a fluid manifold 11, a valve stator 12, a valve rotor 13, a first driving unit 2 and a second driving unit 3. The valve stator 12 and the valve rotor 13 collectively form the build-in rotary valve. The valve stator 12 is disposed at a bottom of the fluid manifold 11, and the valve rotor 13 is disposed at a bottom of the valve stator 12. The first driving unit 2 is connected with and drives a rotation of the valve rotor 13. The second driving unit 3 is connected with and drives a motion of at least one of the valve rotor 13 and the valve stator 12 to adjust a distance between the valve rotor 13 and the valve stator 12, so that when the valve rotor 13 is rotating, the valve rotor 13 and the valve stator 12 are separated by a gap, and after the valve rotor 13 is rotated to a predetermined position, the valve rotor 13 is tightly contacted the valve stator 12.

In an embodiment, the fluid control device 1 further includes a first housing 141 and a second housing 142. The first housing 141 accommodates the valve rotor 13 and parts of the valve stator 12 therein, and the second housing 142 accommodates parts of the first driving unit 2 and parts of the second driving unit 3. In an embodiment, the fluid manifold 11, the first housing 141 and the second housing 142 are fixed and assembled to form a modular structure. Certainly, the fluid manifold 11, the first housing 141 and the second housing 142 can be fixed by fixing elements, and the fixing elements can be but not limited to screws or dowel pins for penetrating through the corresponding holes of the fluid manifold 11, the first housing 141 and the second housing 142 so as to assemble and fix the fluid manifold 11, the first housing 141 and the second housing 142.

In an embodiment, the fluid control device 1 further includes plural fluid sources 4, which includes but not limited to a first fluid source 41 and a second fluid source 42. The fluid sources 4 are connected to the fluid manifold 11 for providing fluids, and the fluids may be gas or liquid. In an embodiment, the fluid sources 4 are gas fluid sources, such as pumps, and the first fluid source 41 and the second fluid source 42 are airs with pressures lower and higher than the atmosphere, respectively. In other words, the first fluid source 41 and the second fluid source 42 provide negative pressure and positive pressure to the fluid control device 1, respectively. In this embodiment, since the fluid sources 4 are gases, contamination issue resulted from the residual liquids when the fluid sources 4 are liquids could be avoided.

In some other embodiments, the fluid sources 4 may be compressed gas, vacuum source, liquid reservoir or combinations thereof. The first fluid source 41 and the second fluid source 42 may be both gas, both liquid, or one gas and one liquid.

In an embodiment, the fluid control device 1 further includes at least one sensor (not shown), such as pressure sensor, flow rate sensor, temperature sensor, pH meter or other types of sensors. The sensor is connected to the fluid manifold 11 for detecting internal signals, such as pressure, flow rate, temperature or pH, of the fluid manifold 11.

In an embodiment, the fluid control device 1 further includes a circuit board (not shown) and a microcontroller (not shown). The circuit board and the microcontroller are connected to the fluid sources 4, the sensor, the first driving unit 2 and the second driving unit 3 to control the fluid sources 4, the sensor, the first driving unit 2 and the second driving unit 3 to be programmed with predefined schemes, and thus, the fluids provided by the fluid sources 4 can be directed to predefined chambers 50 in the sample reaction unit 5, so as to regulate the fluid operations in the chambers 50.

Figure 4B:
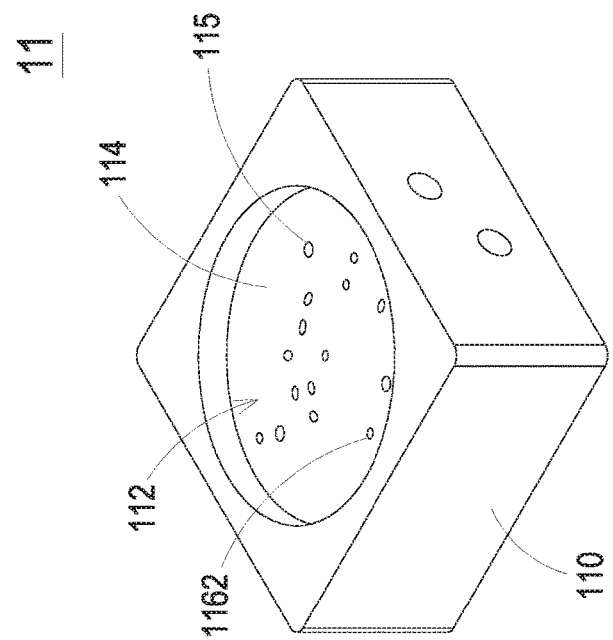
FIGS. 4A and 4B show different views of the fluid manifold.
Figure 4A:
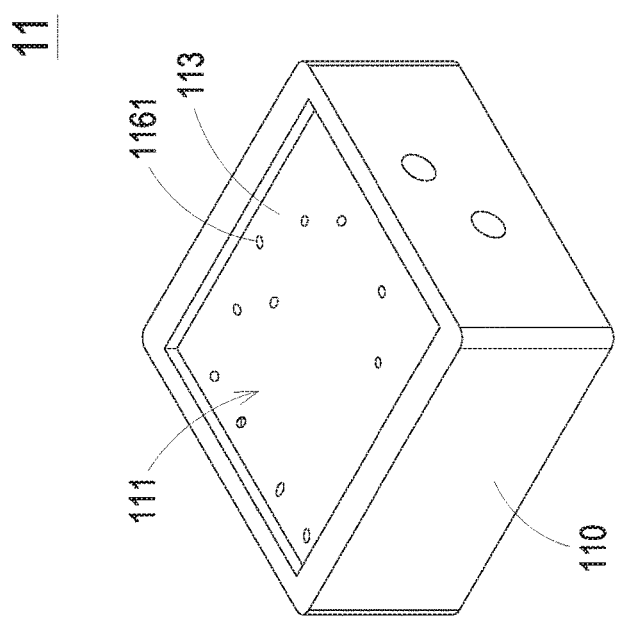
Figure 5B:
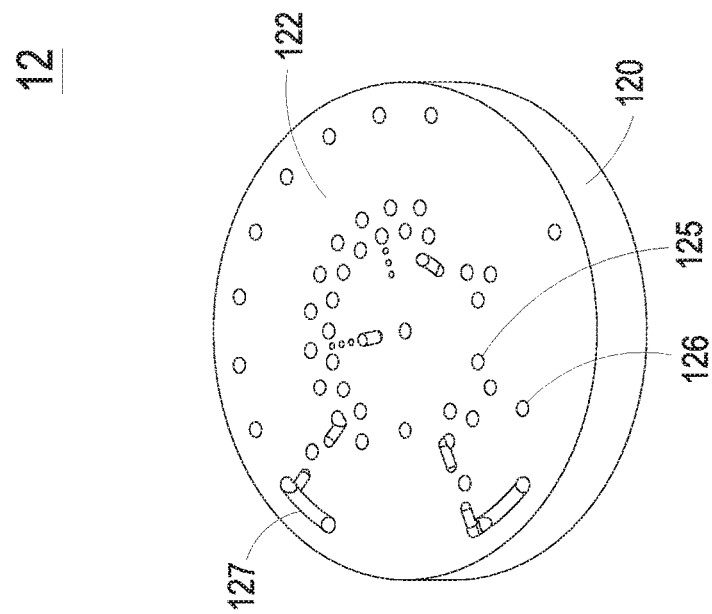
FIGS. 5A and 5B show different views of the valve stator.
Figure 5A:
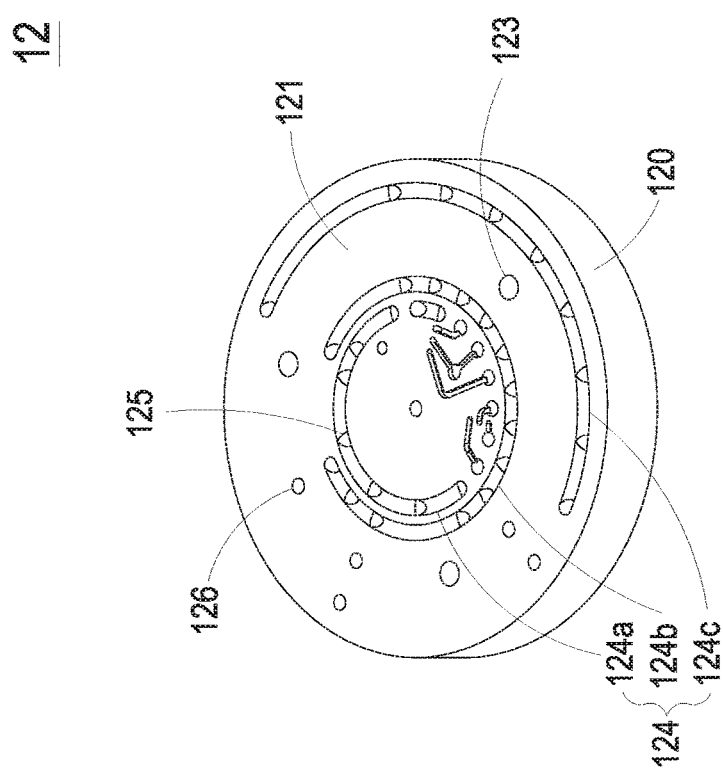
Figure 6B:
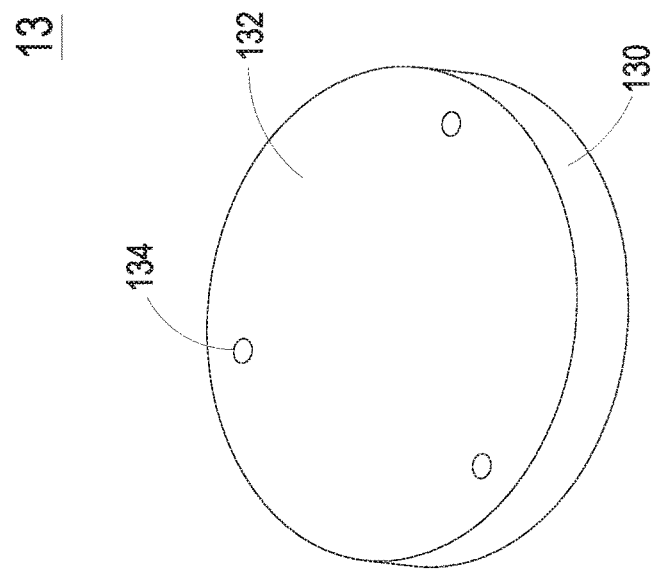
FIGS. 6A and 6B show different views of the valve rotor.
Figure 6A:
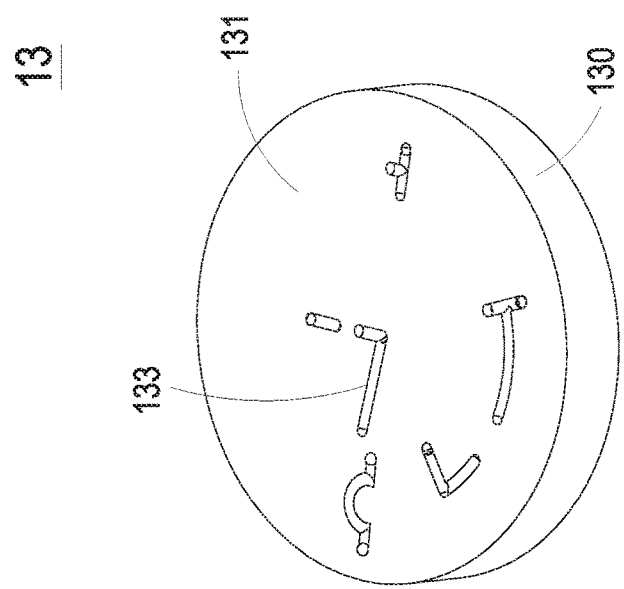

Please refer to FIGS. 1 to 3 again and also refer to FIGS. 4A to 6B, wherein FIGS. 4A and 4B show different views of the fluid manifold, FIGS. 5A and 5B show different views of the valve stator, and FIGS. 6A and 6B show different views of the valve rotor. The fluid manifold 11 includes a main body 110, an installation chamber 111, and a receiving chamber 112. The installation chamber 111 is disposed on a top surface 113 of the main body 110 for installing the sample cartridge 51 or the microfluidic chip 52 thereon. The receiving chamber 112 is disposed on a bottom surface 114 of the main body 110, and the shape of the receiving chamber 112 is substantially corresponding to the shape of the valve stator 12 and slightly larger than the valve stator 12 for accommodating the valve stator 12 therein. In an embodiment, the installation chamber 111 is a concaved platform, such as but not limited to grooves, slots and clips. The depth of the installation chamber 111 is ranged from 0.1 mm to 10 mm depending on the dimensions of the sample reaction unit 5 and is preferably ranged from 0.5 mm to 5 mm.

In an embodiment, the material of the fluid manifold 11 is but not limited to metal, wood, plastic, polymer or glass. The fluid manifold 11 can be fabricated by using CNC machining, casting, inject molding, 3-dimensional printing or layer-to-layer bonding, but not limited thereto.

In an embodiment, the shape of the bottom surface 114 of fluid manifold 11 may be flat, spherical, cambered, cone-shaped, or other irregular shapes as long as it is able to match the top surface of the valve stator 12.

The valve stator 12 is substantially shaped but not limited as a thin cylinder having a main body 120, a top surface 121 and a bottom surface 122. The valve rotor 13 is also substantially shaped but not limited as a thin cylinder having a main body 130, a top surface 131 and a bottom surface 132. When the valve stator 12 and the valve rotor 13 are assembled in the fluid control device 1, the top surface 131 of the valve rotor 13 is substantially attached to the bottom surface 122 of the valve stator 12.

In some other embodiments, the cross-sectional shape of the valve stator 12 is not limited to round shape, and it may be rectangular, triangular or other irregular shapes. In an embodiment, the valve stator 12 has a diameter from 1 mm to 100 mm and a thickness from 0.5 mm to 50 mm.

In an embodiment, the shape of the top surface 121 of the valve stator 12 may be flat, spherical, cambered, cone-shaped, or other irregular shapes as long as it is able to match the bottom surface 114 of fluid manifold 11.

In an embodiment, the top surface 121 of the valve stator 12 is directly attached to the bottom surface 114 of fluid manifold 11. In another embodiment, the fluid control device 1 may selectively include a gasket 16, which is sandwiched between the bottom surface 114 of the fluid manifold 11 and the top surface 121 of the valve stator 12. The compression force provided by the deformation of the gasket 16 offers additional sealing between the fluid manifold 11 and the valve stator 12. In this embodiment, the fluid control device 1 further includes plural first fixing elements 171, such as dowel pins, for penetrating through the corresponding holes 115, 161 and 123 of the fluid manifold 11, the gasket 16 and the valve stator 12 so as to fix the gasket 16 and the valve stator 12 in the receiving chamber 112 of the fluid manifold 11. In an embodiment, the holes 115 and 123 are blind holes, and the hole 161 is a through hole. Certainly, the means of fixing the gasket 16, the valve stator 12 and the fluid manifold 11 is not limited to the dowel pins, and can also be extrusions, screws, grooves, hinge slots or other designs.

In an embodiment, the material of the gasket 16 is rubber, elastomer or other soft plastic, and the thickness of the gasket 16 is ranged from 0.1 mm to 5 mm. In some embodiments, specifically with low valve rotation torques, disc springs are not necessary and therefore the gasket 16 also serves as a "soft spring". In addition to offering additional sealing between the fluid manifold 11 and the valve stator 12, another function of the gasket 16 is to reduce the surface finish requirements on both the bottom surface 114 of fluid manifold 11 and the top surface 121 of valve stator 12.

In an embodiment, the surface shape of the gasket 16 may be flat, spherical, cambered, cone-shaped, or other irregular shapes as long as it is able to match the bottom surface 114 of fluid manifold 11 and the top surface 121 of the valve stator 12.

In some other embodiments, the cross-sectional shape of the valve rotor 13 is not limited to round shape, and it may be rectangular, triangular or other irregular shapes. In an embodiment, the valve rotor 13 has a diameter from 1 mm to 100 mm and a thickness from 0.5 mm to 50 mm.

Figure 7:
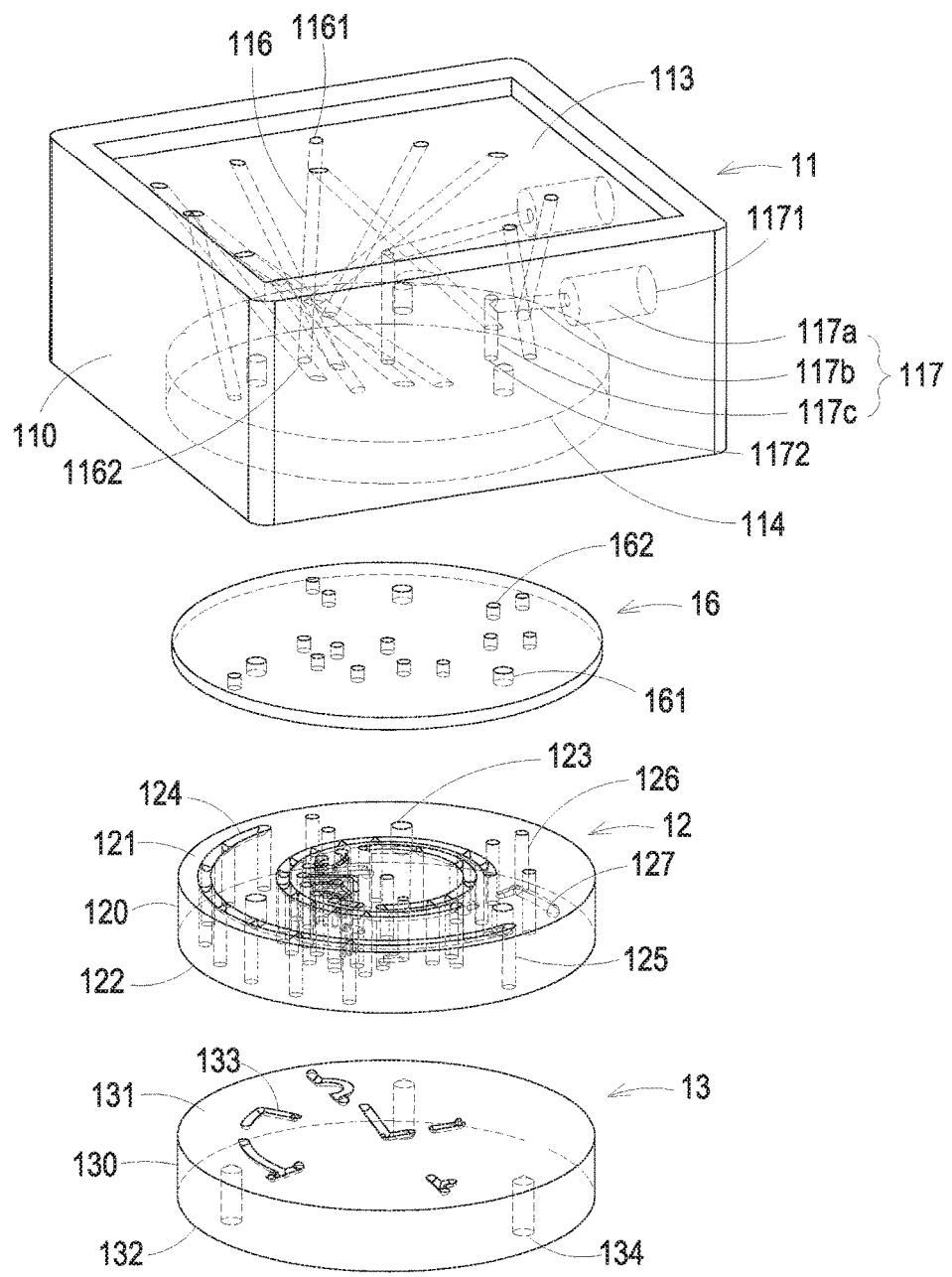
FIG. 7 shows a transparent view of the fluid manifold, the gasket, the valve stator and the valve rotor.

Please refer to FIG. 7 and FIGS. 4A to 6B as well, wherein FIG. 7 shows a transparent view of the fluid manifold, the gasket, the valve stator and the valve rotor. First, it is to be noted that the gasket 16 may be omitted in the structure of the fluid control device 1, that is, the valve stator 12 can be directly attached the bottom of the fluid manifold 11 without the gasket 16. As shown in the figures, the fluid manifold 11 includes plural microchannels 116. Each of the plural microchannels 116 is penetrated through the main body 110 of the fluid manifold 11, and has a first opening 1161 and a second opening 1162 at the top surface 113 and the bottom surface 114 of the fluid manifold 11, respectively. The first openings 1161 of the microchannels 116 are aligned with the openings at the bottom of the sample cartridge 51 or the microfluidic chip 52, which are accesses to the chambers 50 of the sample cartridge 51 or the microfluidic chip 52. The microchannels 116 may be straight, curved, L-shaped, serpentine or whatever shapes as long as they are not intercrossed. In an embodiment, the diameter of the microchannel 116 is ranged from 0.1 mm to 4 mm.

In an embodiment, as shown in FIG. 7, two or more microchannels 116 may commonly own the same opening on the top surface 113 or the bottom surface 114 to increase more variety of the fluid paths. In other words, two or more microchannels 116 may have the same first opening 1161 or the same second opening 1162.

The fluid manifold 11 further includes plural third openings 1171 disposed on but not limited to one surface of the fluid manifold 11 for connecting with the fluid sources 4 to enable the fluids provided by the fluid sources 4 to be delivered to the fluid manifold 11. The third opening 1171 is connected to the bottom surface 114 of the fluid manifold 11 through a fluid input channel 117, and the fluid input channel 117 has a fourth opening 1172 at the bottom surface 114 of the fluid manifold 11. In an embodiment, the fluid input channel 117 includes a first channel 117a, a second channel 117b and a third channel 117c. The other designs for the fluid input channel 117 are also applicable to the present invention as long as they can direct the fluids provided by the fluid sources 4 to the valve stator 12 through the fluid manifold 11.

The gasket 16 includes plural through holes 162, which are aligned with the second openings 1162 of the microchannels 116 and the fourth openings 1172 of the fluid input channels 117, and thus are connected with the microchannels 116 and the fluid input channels 117.

In an embodiment, the valve stator 12 includes plural through holes, such as first through holes 125 and second through holes 126, and the valve rotor 13 includes at least one groove, such as third groove 133. When the valve rotor 13 is rotated to different positions, the fluid input channel 117 of the fluid manifold 11 is connected with at least one of the plural microchannels 114 of the fluid manifold 11 via the through holes of the valve stator 12 and the groove of the valve rotor 13 to provide at least one fluid path and enable fluid provided by the fluid source 4 to be directed to the corresponding chamber 50 of the sample reaction unit 5 through the fluid path and thus regulate the fluid operation of the corresponding chamber 50.

In an embodiment, the valve stator 12 includes at least one first groove 124 and plural first through holes 125. The first through holes 125 are penetrated through the main body 120 of the valve stator 12. The first groove 124 is disposed on the top surface 121 of the valve stator 12 and is extended along the top surface 121 and directly connected with the first through holes 125. In other words, the first groove 124 passes through the first through holes 125, and the first through holes 125 have openings in the first groove 124. Each first groove 124 is directly connected with at least one, preferably at least two, of the plural first through holes 125. At least parts of the first groove 124 or the first through holes 125 are aligned with at least one through hole 162 of the gasket 16, at least one second opening 1162 of the microchannel 116 or at least one fourth opening 1172 of the fluid input channel 117, so that the parts of the first groove 124 or the first through holes 125 are communicated with the microchannels 116 and the fluid input channels 117 of the fluid manifold 11. In an embodiment, the diameter of the first through hole 125 is not greater than the width of the first groove 124, and the incoming fluids introduced from the fluid manifold 11 are distributed to multi-paths via the first groove 124 and the first though holes 125 to the bottom surface 122 of valve stator 12.

In an embodiment, the width and the depth of the first groove 124 are both ranged from 0.1 mm to 5 mm and the cross-section of the first groove 124 can be round, rectangular, triangular, trapezoid or other shapes as long as the fluids are able to pass through the first groove 124. In an embodiment, the first groove 124 is extended along a circular pattern but not limited thereto, and it can also be straight, curved, serpentine, L-shaped, T-shaped or other shapes. In an embodiment, the valve stator 12 includes the first grooves 124a, 124b and 124c, and the first grooves 124a, 124b and 124c are extended along concentric circles with different radiuses.

In an embodiment, the valve stator 12 further includes plural second through holes 126 which are penetrated through the main body 120 of the valve stator 12 and are not directly connected with the first groove 124. In other words, the first groove 124 does not pass through the second through holes 126. The second through holes 126 are aligned with at least one through hole 162 of the gasket 26, at least one second opening 1162 of the microchannel 116 or at least one fourth opening 1172 of the fluid input channel 117, so that the second through holes 126 are communicated with the microchannels 116 and the fluid input channels 117 of the fluid manifold 11.

In an embodiment, the valve stator 12 further includes at least one second groove 127 disposed on the bottom surface 122 of the valve stator 12. The second groove 127 is extended along the bottom surface 122 and directly connected with at least one or at least two of the second through holes 126. In other words, the second groove 127 passes through at least one or at least two of the second through holes 126, and the second through holes 126 have openings in the second groove 127. In an embodiment, the width and the depth of the second groove 127 are both ranged from 0.1 mm to 5 mm and the cross-section of the second groove 127 can be round, rectangular, triangular, trapezoid or other shapes as long as the fluids are able to pass through the second groove 127. In an embodiment, the second groove 127 can be extended along circular, straight, curved, serpentine, L-shaped, T-shaped or other shaped pattern.

The valve rotor 13 is disposed at the bottom of the valve stator 12, and the top surface 131 of the valve rotor 13 directly contacts the bottom surface 122 of the valve stator 12. The valve rotor 13 includes at least one third groove 133 or other concaved pattern disposed on the top surface 131 of the valve rotor 13. When the valve rotor 13 is rotated by a certain angle to a predetermined position, the third groove 133 at the top surface 131 of the valve rotor 13 is selectively connected with at least one of the second groove 127 at the bottom surface 122 of the valve stator 12, the first through holes 125 and the second through holes 126 to realize fluid path switching.

In an embodiment, the width and the depth of the third groove 133 are both ranged from 0.1 mm to 5 mm and the cross-section of the second groove 127 can be round, rectangular, triangular, trapezoid or other shapes as long as the fluids are able to pass through the third groove 133. In an embodiment, the third groove 133 can be extended along circular, straight, curved, serpentine, L-shaped, T-shaped or other shaped pattern.

Please refer to FIGS. 8A and 8B, wherein FIG. 8A shows a top view of the valve stator, and FIG. 8B shows a top view of the valve rotor. In an embodiment, the valve stator 12 and the valve rotor 13 are respectively divided into plural regions, and the plural regions are divided axially, sectorially or irregularly. Each region includes grooves and/or through holes responsible to the regulation of one type of fluid source. For example, as shown in FIGS. 8A and 8B, the top surface 121 of the valve stator 12 and the top surface 131 of the valve rotor 13 respectively includes two regions, and the two regions are separated by dashed lines, wherein the top surface 121 of the valve stator 12 includes an inner region 121a and an outer region 121b, and the top surface 131 of the valve rotor 13 includes an inner region 131a and an outer region 131b. In an embodiment, the inner region 121a of the valve stator 12 and the inner region 131a of the valve rotor 13 collectively involves the regulation of the first fluid source 41, such as the regulation of the negative pressure, and the outer region 121b of the valve stator 12 and the outer region 131b of the valve rotor 13 collectively involves the regulation of the second fluid source 42, such as the regulation of the positive pressure.

Certainly, the divisions are not limited to the two regions shown in FIGS. 8A and 8B, and may also be three or more regions. For example, the valve stator 12 and the valve rotor 13 may be axially divided into three regions from the inside to the outside, or be sectorially divided into three regions. In coordination with the operation of the rotary valve, these regions can work individually with predefined protocols. In some embodiments, when the valve rotor 13 is rotated to one or more designed positions, one or more grooves 124, 127 and 133 and through holes 125 and 126 can connect one or more of these regions.

Please refer to FIG. 7 again. The fluids provided by the first fluid source 41 and the second fluid source 42 are inputted to the fluid manifold 11 through the fluid input channels 117. Since the third groove 133 on the top surface 131 of the valve rotor 13 is aligned with at least one of the first through holes 125, the second through holes 126 and the second groove 127 on the bottom surface 121 of the valve stator 12, and the first groove 124, the first through holes 125 and the second through holes 126 on the top surface 121 of the valve stator 12 are aligned with the second openings 1162 of the microchannels 116 and the fourth openings 1172 of the fluid input channels 117 of the fluid manifold 11, when the valve rotor 13 is rotated by a certain angle to a predetermined position, the fluid input channels 117 are communicated with the predefined microchannels 116 through the valve stator 12 and the valve rotor 13 and thus the fluids provided by the first fluid source 41 and the second fluid source 42 are directed to the chambers 50 of the sample reaction unit 5 which are connected with the predefined microchannels 116 so as to regulate the fluid operations in the multiple chambers 50 of the sample reaction unit 5. Particularly, the first groove 124 on the top surface 121 of the valve stator 12 are directly connected with the plural first through holes 125 to realize the multi-way fluid path switching.

Please refer to FIG. 2A, FIG. 2B and FIG. 3 again. The first driving unit 2 is connected with and drives a rotation of the valve rotor 13. In an embodiment, the first driving unit 2 comprises a driving component 20 and a transmission component including a worm 21 and a gear 22. The driving component 20 is preferably a motor, such as a stepped motor. The driving component 20 drives the rotations of the worm 21 and the gear 22, and further drives the rotation of the valve rotor 13 which is connected with the gear 22. In an embodiment, the gear 22 can be directly connected with the valve rotor 13 or indirectly connected with the valve rotor 13 via a rotor connector 15. The rotor connector 15 can be fixed to the valve rotor 13 by second fixing elements 172, which can be but not limited to screws or dowel pins for penetrating through the corresponding holes 134 and 151 of the valve rotor 13 and the rotor connector 15 so as to assemble and fix the valve rotor 13 and the rotor connector 15, and the gear 22 can be inserted and fixed to the rotor connector 15 via a central axis 221.

Certainly, the driving component 20 of the first driving unit 2 is not limited to the motor, and can also be rotary solenoid, electromagnet, thermal expansion unit, optical induced actuator, pneumatic component, piezoelectric component or any other driving component that is able to turn the valve rotor 13 by a certain angle according to the working protocol. The first driving unit 2 can drive the rotation of the valve rotor 13 directly or indirectly through the transmission component. The transmission component is not limited to the worm 21 and the gear 22, and can also be gear group, rack, belt, chain, screw or combinations thereof. In another embodiment, the rotation of the valve rotor 13 can be manually operated by users through a knob or a handle.

The second driving unit 3 is connected with and drives the motion of at least one of the valve rotor 13 and the valve stator 12 to adjust the distance between the valve rotor 13 and the valve stator 12. As shown in the embodiment of FIG. 2A, FIG. 2B and FIG. 3, the second driving unit 3 comprises a driving component 30 and a transmission component including a lead screw 31 and a sliding nut 32 with inner thread. The driving component 30 is preferably a motor, such as a stepped motor. The driving component 30 drives the rotation of the lead screw 31, and simultaneously drives the vertical motion of the sliding nut 32 by thread transmission while the lead screw 31 is rotating, so as to further drive the vertical motion of the valve rotor 13 connected with the sliding nut 32 to enable the ascending and descending of the valve rotor 13. In this embodiment, the sliding nut 32 is connected with the valve rotor 13 via the rotor connector 15 as well. FIG. 2A shows the valve rotor 13 is ascended to be tightly contacted the valve stator 12, and FIG. 2B shows the valve rotor 13 is descended so that the valve rotor 13 and the valve stator 12 are separated by a gap G.

The object of the second driving unit 3 is to adjust the distance between the valve rotor 13 and the valve stator 12. Therefore, except for driving the vertical motion of the valve rotor 13 as described above, the object can also be achieved by driving the vertical motion of the valve stator 12 or both the vertical motions of the valve stator 12 and the valve rotor 13.

Certainly, the driving component 30 of the second driving unit 3 is not limited to the motor, and can also be electromagnet, thermal expansion unit, optical induced actuator, pneumatic component, piezoelectric component or any other driving component that is able to periodically drive the vertical motion of the valve rotor 13 or the valve stator 12 to adjust the distance between the valve rotor 13 and the valve stator 12. The second driving unit 3 can drive the vertical motion of the valve rotor 13 or the valve stator 12 directly or indirectly through the transmission component. The transmission component is not limited to the lead screw 31 and the sliding nut 32, and can also be gear, rack, belt, chain, screw or combinations thereof.

In another embodiment, the vertical motion of the valve rotor 13 or the valve stator 12 can be manually operated by users.

According to the present invention, when the valve rotor 13 is rotated by a certain angle to a predetermined position, the third groove 133 at the top surface 131 of the valve rotor 13 is selectively connected with at least one of the second groove 127 at the bottom surface 122 of the valve stator 12, the first through holes 125 and the second through holes 126 to realize fluid path switching. In order to eliminate the significant torque acting on the stator-rotor interface without sacrificing the sealing during rotary valve operation, the present invention utilizes dual driving units to respectively drive the rotation of the valve rotor 13 and adjust the distance between the valve rotor 13 and the valve stator 12. The first driving unit 2 is in charge of the rotation of the valve rotor 13 to turn the valve rotor 13 by a certain angle to a predetermined position so as to provide a particular fluid path. The second driving unit 3 is in charge of the vertical motions of the valve rotor 13 and/or the valve stator 12 to adjust the distance between the valve rotor 13 and the valve stator 12 so as to enable the valve rotor 13 and the valve stator 12 to be tightly contacted each other or be separated from each other by a tiny gap. Once the valve rotor 13 is turned to predetermined positions, the second driving unit 3 is actuated and thus pushes the valve rotor 13 and the valve stator 12 to be tightly contacted each other so as to yield a superior sealing. On the contrary, when the valve rotor 13 is turning from one valve position to the next, the second driving unit 3 is actuated to separate the valve rotor 13 from the valve stator 12 and thus a tiny gap appears between the valve rotor 13 and the valve stator 12 so as to minimize the friction therebetween, and as a result, the valve rotor 13 is rotated at almost zero friction condition.

In an embodiment, the valve rotor 13 and the valve stator 12 are initially tightly contacted each other in order to guarantee a good sealing. During the rotary valve operation, the second driving unit 3 repels them away from each other and creates a tiny gap therebetween to minimize the resistance when turning the valve rotor 13. In another embodiment, the valve rotor 13 and the valve stator 12 are initially detached. Once the valve rotor 13 is turned to predetermined positions, the second driving unit 3 allows them to be tightly contacted each other and thus results in a superior sealing without fluid leakage during the rotary valve operation.

According to the present invention, since the valve rotor 13 can rotate at almost zero friction condition, only a tiny torque is needed to turn the valve rotor 13 during the operation. Therefore, the driving component 20 of the first driving unit 2 can be a tiny motor or other tiny driving component. As a result, the volume of the overall fluid control device 1 can be greatly reduced, and the cost and the power consumption are also reduced. Meanwhile, minimized friction further avoids the wear and tear of the valve rotor 13 and the valve stator 12, and thus the device lifespan is extended. In an embodiment, the driving component 20 of the first driving unit 2 can be a 15 mm stepper motor and even a smaller one, and can be embedded mostly within the second housing 142. In addition, the design of the worm 21 and the gear 22 also reduces the needed space and significantly dilutes the error during motor control and rotor rotation, allowing smaller and cheaper motor in the device. In an embodiment, the overall fluid control device 1 is very compact and the height thereof is around 65 mm or less.

On the other hand, since the valve rotation and the fluid sealing are decoupled, the surface finish requirements of the valve rotor 13 and the valve stator 12 are reduced, and thus softer materials can be selected for fabricating the valve rotor 13 and the valve stator 12. The softer materials can be but not limited to Teflon (also called polytetrafluoroethylene, PTFE), Nylon, rubber, polymer compound, silicone or other material as long as it is able to have good sealing while sustaining external compression force. Accordingly, the fabrication cost can be reduced. Certainly, in some other embodiments, the materials of the valve rotor 13 and the valve stator 12 can be metal such as stainless steel, nickel or titanium, and also can be plastic, polymer, glass or ceramic, all of which are ordinarily used for fabricating the valve rotor 13 and the valve stator 12, or combinations of the aforesaid materials.

Since the design of dual driving units decouples the valve rotation and the fluid sealing, the valve rotor 13 is rotated at almost zero friction condition. Therefore, tiny driving components with low torque can be used, which reduces the volume and the cost of the overall device. Also, the wear and tear of the valve rotor 13 and the valve stator 12 is avoided, which extends the device lifespan and is beneficial for the material selection of the valve rotor 13 and the valve stator 12.

In an embodiment, the fluid control device 1 further comprises reduction gears and encoder disks for accurate control.

Figure 10B:
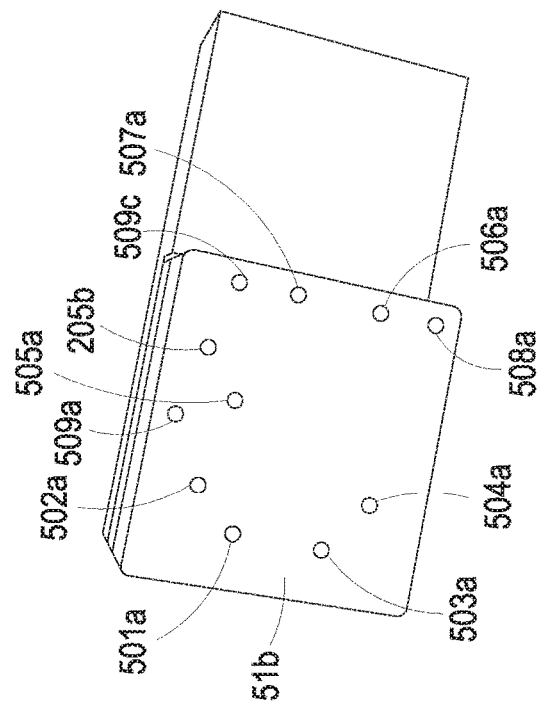
FIGS. 10A and 10B show different views of the sample cartridge in FIG. 9.
Figure 10A:
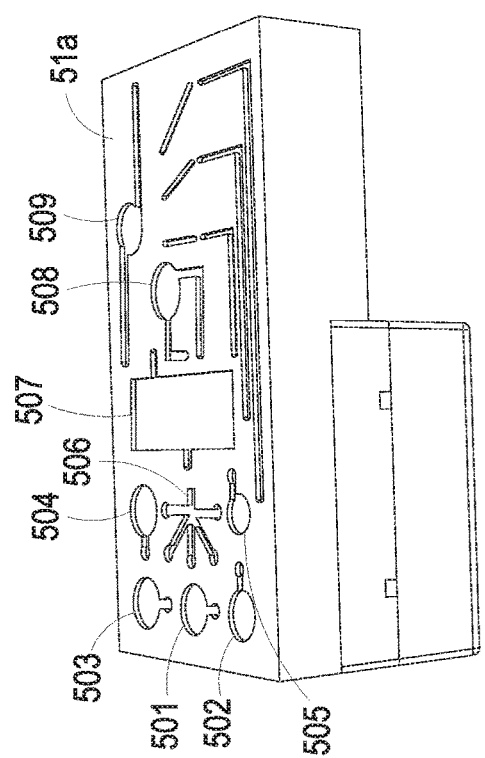

The following uses examples to illustrate the operations of the fluid control device of the present invention. Please refer to FIGS. 9, 10A and 10B, wherein FIG. 9 shows the assembled structure of the fluid control device and the sample cartridge, and FIGS. 10A and 10B show different views of the sample cartridge in FIG. 9. As shown in the figures, the sample cartridge 51 is mounted on the fluid control device 1. The top surface 51a of the sample cartridge 5 includes plural chambers 501 to 509 which are connected by microchannels. The bottom surface 51b of sample cartridge 5 includes plural openings 501a to 509c which are accesses to the plural chambers 501 to 509 through microchannels. In this embodiment, the first fluid source 41 and the second fluid source 42 are pumps providing negative pressure and positive pressure, respectively, and the provided external fluids will be directed to the corresponding chambers 501 to 509 through the openings 501a to 509c after switching the fluid path by the build-in rotary valve.

Figure 11A:
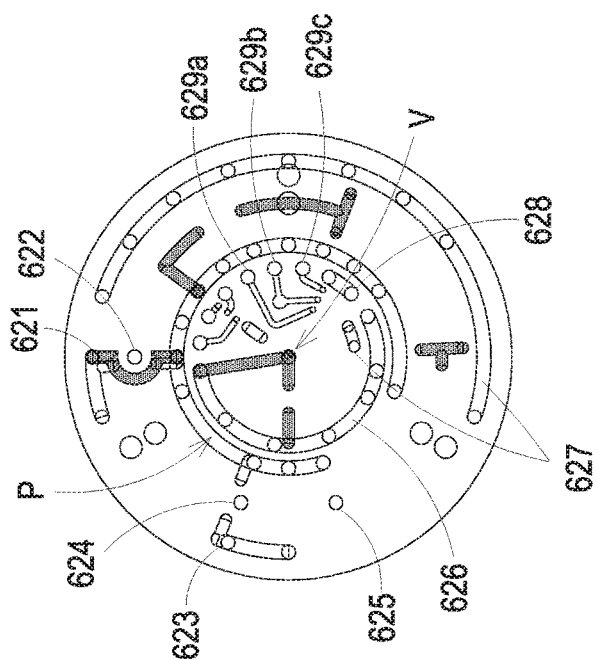
FIGS. 11A and 11B show transparent views of the assembly of the valve rotor and the valve stator when the valve rotor is rotated to different positions.
Figure 11B:
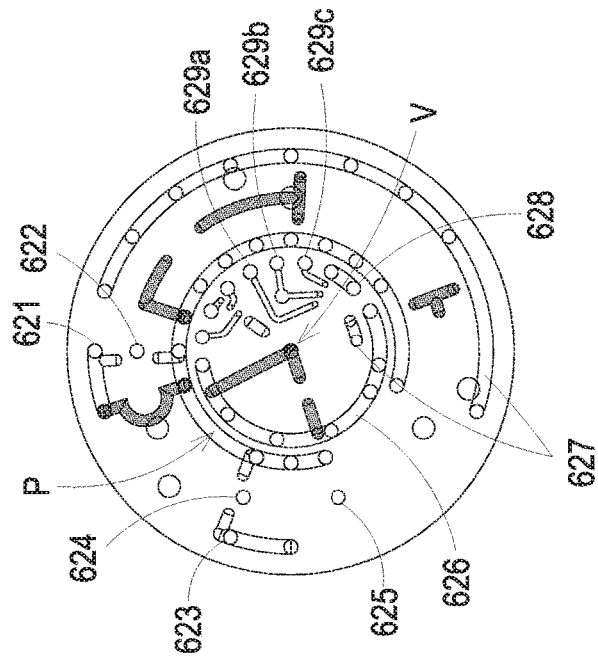

Please refer to FIGS. 11A and 11B which show transparent views of the assembly of the valve rotor and the valve stator when the valve rotor is rotated to different positions, wherein these figures are viewed from the bottom of the valve rotor toward the valve stator. For more clearly illustrating the rotation positions of the valve rotor 13, the third grooves 133 on the top surface 131 of the valve rotor 13 are further labeled with dots. Please also refer to FIGS. 5A to 10B. In these embodiments, the first fluid source 41 is a pump providing negative pressure, and the provided fluid is directed to the second through hole 126 (denoted by V) at the center position in the inner region 121a of the valve stator 12 through the fluid input channel 117, and the second fluid source 42 is a pump providing positive pressure, and the provided fluid is directed to the outer region 121b which is corresponding to the position of the first groove 124b (denoted by P) of the valve stator 12 through the fluid input channel 117.

When the sample cartridge 5 is mounted on the fluid control device 1, the plural openings 501a to 509c on the bottom surface 51b of the sample cartridge 5 are aligned and connected with the plural first openings 1161 on the top surface 113 of the fluid manifold 11, and further connected with the through holes or grooves 621 to 629 of the valve stator 12 through the microchannels 116 of the fluid manifold 11.

In an embodiment, the positions of the valve rotor 13 are defined by the rotation angles and include 20 positions (#1 to #20), and each position is uniformly arranged so that the neighboring positions are separated by 18 degrees. For example, the valve rotor 12 is rotated to position #2 from position #1 by 18 degrees. In another embodiment, the positions of the valve rotor 13 may not be uniformly arranged, and thus the neighboring positions are separated by an angle larger or smaller than 18 degrees. The position switching is operated according to the requirement of fluid path switching and is not necessary to be operated in sequence.

FIGS. 11A and 11B show the fluid path switching manner of the build-in rotary valve for the step of transporting fluid from the chamber 501 to the chamber 506 and then from the chamber 506 to the chamber 507. First, the valve rotor 13 is located at the initial position, i.e. position #1 (as shown in FIG. 11A), and meanwhile, the second driving unit 3 is actuated to enable the valve rotor 13 and the valve stator 12 to be tightly contacted each other so as to yield a superior sealing. The positive pressure (P) provided by the second fluid source 42 is introduced to the first groove 124*b* on the top surface 121 of the valve stator 12, and accordingly, the fluid with positive pressure is transported via the first groove 124*b* of the valve stator 12, the first through hole 125 of the valve stator 12 connected with the first groove 124*b*, and the third groove 133 of the valve rotor 13 connected with the first through hole 125, and then to the through hole 621 of the valve stator 12 connected with the third groove 133, and thus, the positive pressure is applied to the through hole 621. Since the through hole 621 is the access to the chamber 501 via the opening 501*a*, the chamber 501 is applied with the positive pressure as well. Meanwhile, the negative pressure (V) provided by the first fluid source 41 is introduced to the central second through hole 126 of the valve stator 12, and accordingly, the fluid with negative pressure is transported via the second through hole 126 of the valve stator 12, the third groove 133 of the valve rotor 13 connected with the second through hole 126, the first through hole 125 of the valve stator 12 connected with the third groove 133, and the first groove 124*a* of the valve stator 12 connected with the first through hole 125, and then to the groove 626 of the valve stator 12, and thus, the negative pressure is applied to the groove 626. Since the groove 626 is the access to the chamber 506 via the opening 506*a*, the chamber 506 is applied with the negative pressure as well. Therefore, by applying positive pressure to the chamber 501 and applying negative pressure to the chamber 506, the fluid (such as sample or reagent) in the chamber 501 is pushed to the chamber 506.

Afterwards, the second driving unit 3 is actuated to separate the valve rotor 13 from the valve stator 12 and thus a tiny gap appears between the valve rotor 13 and the valve stator 12, and then the first driving unit 2 is actuated to turn the valve rotor 13 by 18 degrees in a counterclockwise direction to the position #2 (as shown in FIG. 11B). Subsequently, the second driving unit 3 is actuated again to enable the valve rotor 13 and the valve stator 12 to be tightly contacted each other so as to yield a superior sealing, and the positive pressure (P) provided by the second fluid source 42 is introduced to the first groove 124*b* on the top surface 121 of the valve stator 12. Accordingly, the fluid with positive pressure is transported via the first groove 124*b* of the valve stator 12, the first through hole 125 of the valve stator 12 connected with the first groove 124*b*, the third groove 133 of the valve rotor 13 connected with the first through hole 125, and the second groove 127 on the bottom surface 122 of the valve stator 12 connected with the third groove 133, and then to the through hole 621 of the valve stator 12 connected with the second groove 127, and thus, the positive pressure is applied to the through hole 621. Since the through hole 621 is the access to the chamber 501 via the opening 501*a*, the chamber 501 is applied with the positive pressure as well. Meanwhile, the negative pressure (V) provided by the first fluid source 41 is introduced to the central second through hole 126 of the valve stator 12, however, since the third groove 133 of the valve rotor 13 connected with the central second through hole 126 is not connected with any through hole or groove of the valve stator 12, the fluid path is blocked and thus no chamber of the sample cartridge 51 will be applied with negative pressure. Since the chamber 501 is continuously applied with positive pressure, the fluid in the chamber 506 can be further pushed to the chamber 507.

According to the above descriptions, the fluid operations in the plural chambers 501 to 509 of the sample cartridge 51 depend on the layout designs of the through holes and grooves on the valve stator 12 and the valve rotor 13. When the valve rotor 13 is rotated by a certain angle to a predetermined position, the predefined fluid paths are connected so that the fluid with negative pressure provided by the first fluid source 41 and the fluid with positive pressure provided by the second fluid source 42 can be transported to the corresponding microchannels of the fluid manifold 11 via the fluid paths and then further transported to the corresponding chambers 501 to 509 of the sample cartridge 51, and thereby applying positive or negative pressure to the corresponding chambers 501 to 509. Therefore, the fluids, such as the sample or reagents, in the chambers 501 to 509 can be pushed to flow toward desired directions, so as to regulate the fluid operations in the chambers 501 to 509.

Since the sample cartridge 51 shown in FIGS. 10A and 10B is only used to illustrate how the fluid control device 1 involves the fluid operations in the plural chambers 501 to 509 of the sample cartridge 51 but not used to limit the present invention, and when the valve rotor 13 is rotated to different positions, the operation principles are similar to those in FIGS. 11A and 11B, and thus are not redundantly described here.

In some embodiments, when the quantity of the openings at the bottom of the sample reaction unit 5 is different or less than the quantity of the first openings 1161 of the fluid manifold 11, only some of the first openings 1161 and the corresponding microchannels 116 of the fluid manifold 11 can be connected with the sample reaction unit 5, and the rest of them are naturally blocked by the body of the sample reaction unit 5. Accordingly, once the build-in rotary valve is in operation, the valve positions connected to these blocked first openings 1161 are skipped. Therefore, by means of the modular design, the fluid control device 1 of the present invention is able to be applied to different sample reaction units 5, which increases the applicability of the fluid control device 1 of the present invention.

In addition, the fluid control device 1 of the present invention is capable of catering flexible sample processing protocols by selectively defining certain valve operation procedures. In some embodiments, each valve position and their operation orders could be freely combined and thus versatile sample processing protocols can be achieved. In many biological, chemical and life science processes, the primary working principle is maintained while for specific samples or species, their respective processes are slightly different. For example, the infectious disease diagnostic devices are capable of covering a wide range of samples. However, for each sample to be detected, the type, volume and quantity of chemical buffers, bio assay and the methods of capturing, lysis and purification are not always same. The fluid control device 1 of the present invention has the ability of dealing with these flexible sample processing protocols by the operations of the rotary valve.

Moreover, compared to the conventional techniques using the electromagnetic valves for fluid path switching, the fluid control device 1 of the present invention using single build-in rotary valve for fluid path switching greatly reduces the cost and equipment space. Further, the fluid control device 1 of the present invention uses the microchannels 116 of the fluid manifold 11 to connect the sample reaction unit 5 and the valve stator 12, so the drawbacks of short lifespan, space consuming, poor manufacturability and low reliability of the tubing used in the conventional techniques can be avoided. Besides, the fluid control device 1 of the present invention is a modular design which is able to be applied to different sample reaction unit 5, and thus possesses high industrial value.

Furthermore, since the design of dual driving units decouples the valve rotation and the fluid sealing, the valve rotor 13 is rotated at almost zero friction condition. Therefore, tiny driving components with low torque can be used, which reduces the volume and the cost of the overall device. Also, the wear and tear of the valve rotor 13 and the valve stator 12 is avoided, which extends the device lifespan and is beneficial for the material selection of the valve rotor 13 and the valve stator 12.

In conclusion, the present invention provides the fluid control device including the fluid manifold, the rotary valve including the valve stator and the valve rotor, a first driving unit and a second driving unit. The fluid manifold includes plural microchannels for connecting with the sample reaction unit. By the alignments of the through holes and/or grooves of the valve stator and the valve rotor, multi-way fluid path switching is realized when the valve rotor is rotated to different positions, so as to regulate the fluid operations in the multiple chambers of the sample reaction unit. The dual driving units further overcome the defects resulted from high friction during valve rotation of the conventional rotary valve. Compared to the conventional techniques, the fluid control device of the present invention has advantages of low cost, space saving, long lifespan, better material selection, good manufacturability, high reliability, and compact modular design, and thus possesses high industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fluid control device connected with a sample reaction unit having multiple chambers to regulate fluid operations in a multi-fluid-system, the fluid control device comprising:
   a fluid manifold comprising a main body, plural microchannels and plural fluid input channels, wherein each of the plural microchannels penetrates through the main body and is connected with a corresponding chamber of the sample reaction unit, and the plural fluid input channels are connected with plural fluid sources;
   a rotary valve comprising a valve stator and a valve rotor, wherein the valve stator is disposed at a bottom of the fluid manifold and comprising plural through holes, the valve rotor is disposed at a bottom of the valve stator and comprising at least one groove, and when the valve rotor is rotated to different positions, the fluid input channel is connected with at least one of the plural microchannels via the through holes of the valve stator and the groove of the valve rotor to provide at least one fluid path and enable fluid provided by the fluid source to be directed to the corresponding chamber of the sample reaction unit through the fluid path and thus regulate the fluid operation of the corresponding chamber;
   a first driving unit connected with and driving a rotation of the valve rotor; and
   a second driving unit connected with and driving a motion of at least one of the valve rotor and the valve stator to adjust a distance between the valve rotor and the valve stator, so that when the valve rotor is rotating, the valve rotor and the valve stator are separated by a gap, and after the valve rotor is rotated to a predetermined position, the valve rotor is tightly contacted the valve stator.

2. The fluid control device according to claim 1 wherein each of the first driving unit and the second driving unit comprises a driving component and a transmission component.

3. The fluid control device according to claim 2 wherein the driving component of the first driving unit is a stepped motor having a size not larger than 15 mm.

4. The fluid control device according to claim 2 wherein the transmission component of the first driving unit comprises a worm and a gear.

5. The fluid control device according to claim 2 wherein the transmission component of the second driving unit comprises a lead screw and a sliding nut.

6. The fluid control device according to claim 2 wherein the driving component is a motor, an electromagnet, a thermal expansion unit, an optical induced actuator, a pneumatic component or a piezoelectric component.

7. The fluid control device according to claim 2 wherein the transmission component is a gear, a rack, a belt, a chain, a screw or combinations thereof.

8. The fluid control device according to claim 1 further comprising a rotor connector connected between the valve rotor and the first driving unit.

9. The fluid control device according to claim 1 wherein the material of the valve rotor and the valve stator is Teflon, Nylon, rubber, polymer compound, silicone, metal, plastic, polymer, glass, ceramic or combinations thereof.

10. The fluid control device according to claim 1 wherein the valve stator and the valve rotor respectively includes plural regions corresponding to the plural fluid sources for regulating fluid path switching of the corresponding fluid sources.

11. The fluid control device according to claim 1 wherein the plural fluid sources includes a fluid source with positive pressure and a fluid source with negative pressure.

12. The fluid control device according to claim 1 wherein the valve stator further comprises at least one groove disposed on a top surface or a bottom surface of the valve stator and is directly connected with at least one of the plural through holes, and at least parts of the groove and the through holes are communicated with the plural microchannels and plural fluid input channels of the fluid manifold.

13. The fluid control device according to claim 12 wherein the at least one groove of the valve stator includes at least one first groove and at least one second groove, the at least one first groove is disposed on the top surface of the valve stator, and the at least one second groove is disposed on the bottom surface of the valve stator.

14. The fluid control device according to claim 13 wherein the at least one first groove of the valve stator includes plural first grooves, and the plural first grooves are extended along concentric circles with different radiuses.

15. The fluid control device according to claim 13 wherein the plural through holes of the valve stator includes plural first through holes and plural second through holes, the plural first through holes are directly connected with the at least one first groove, the plural second through holes are not directly connected with the at least one first groove, and each of the at least one first groove is directly connected with at least two of the plural first through holes.

16. The fluid control device according to claim 15 wherein each of the at least one second groove of the valve stator is directly connected with at least one of the plural second through holes.

17. The fluid control device according to claim 1 wherein the at least one groove of the valve rotor is disposed on a top surface of the valve rotor.

18. The fluid control device according to claim 1 further comprising a gasket sandwiched between the fluid manifold and the valve stator.

19. The fluid control device according to claim 18 wherein the gasket includes plural through holes, which are connected with the plural microchannels and the plural fluid input channels of the fluid manifold.

20. The fluid control device according to claim 1 wherein the sample reaction unit is a sample cartridge or a microfluidic chip.

* * * * *